INVENTOR.
EDWARD W. SCHATZMAN
BY Joseph A. Rave
Attorney

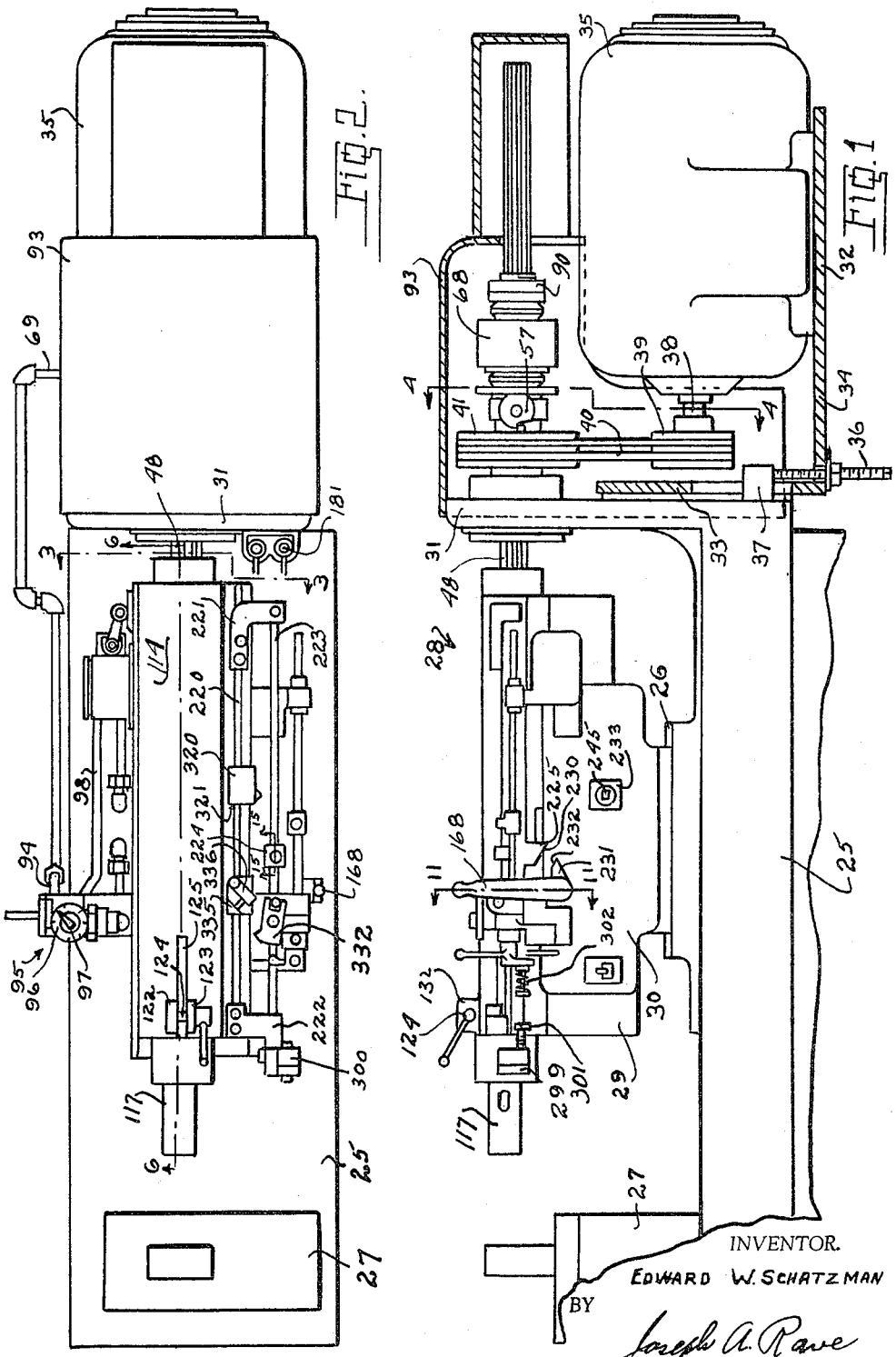

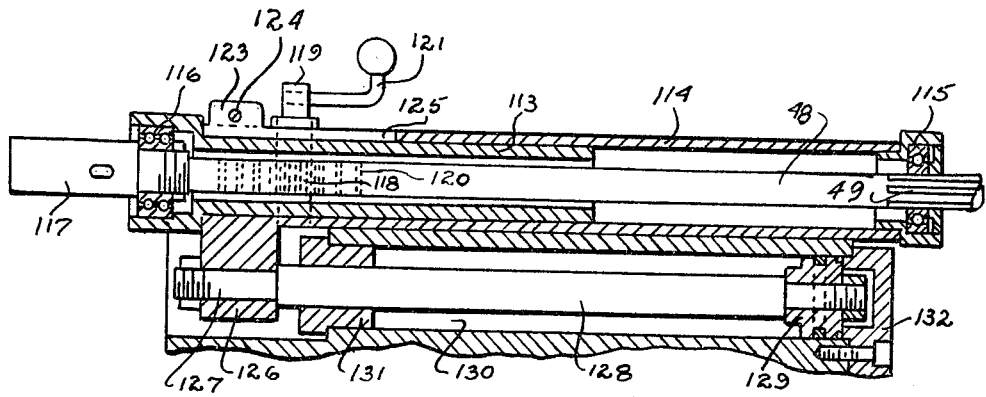
Fig.6.
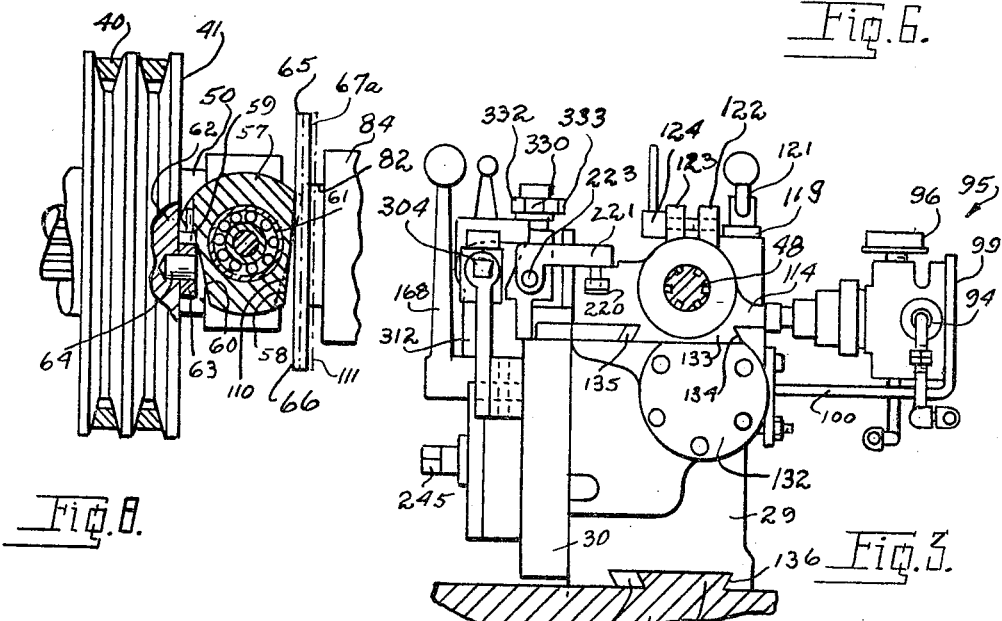
Fig.8.
Fig.3.
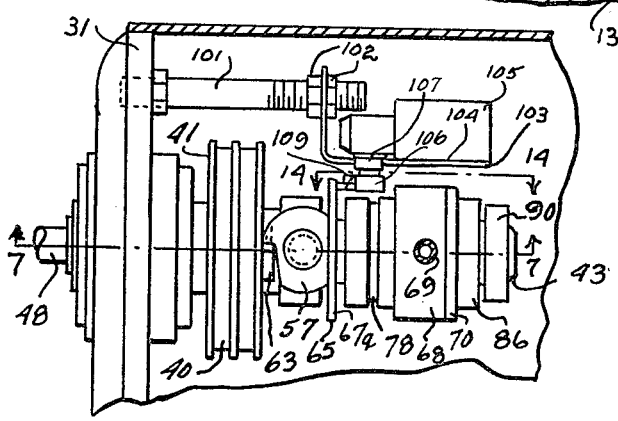
Fig.5.
INVENTOR.
EDWARD W. SCHATZMAN
BY
Joseph A. Rave
Attorney Nov. 8, 1966   E. W. SCHATZMAN   3,283,618
TORQUE CONTROLLED MACHINE TOOL
Filed Aug. 26, 1964   6 Sheets-Sheet 3

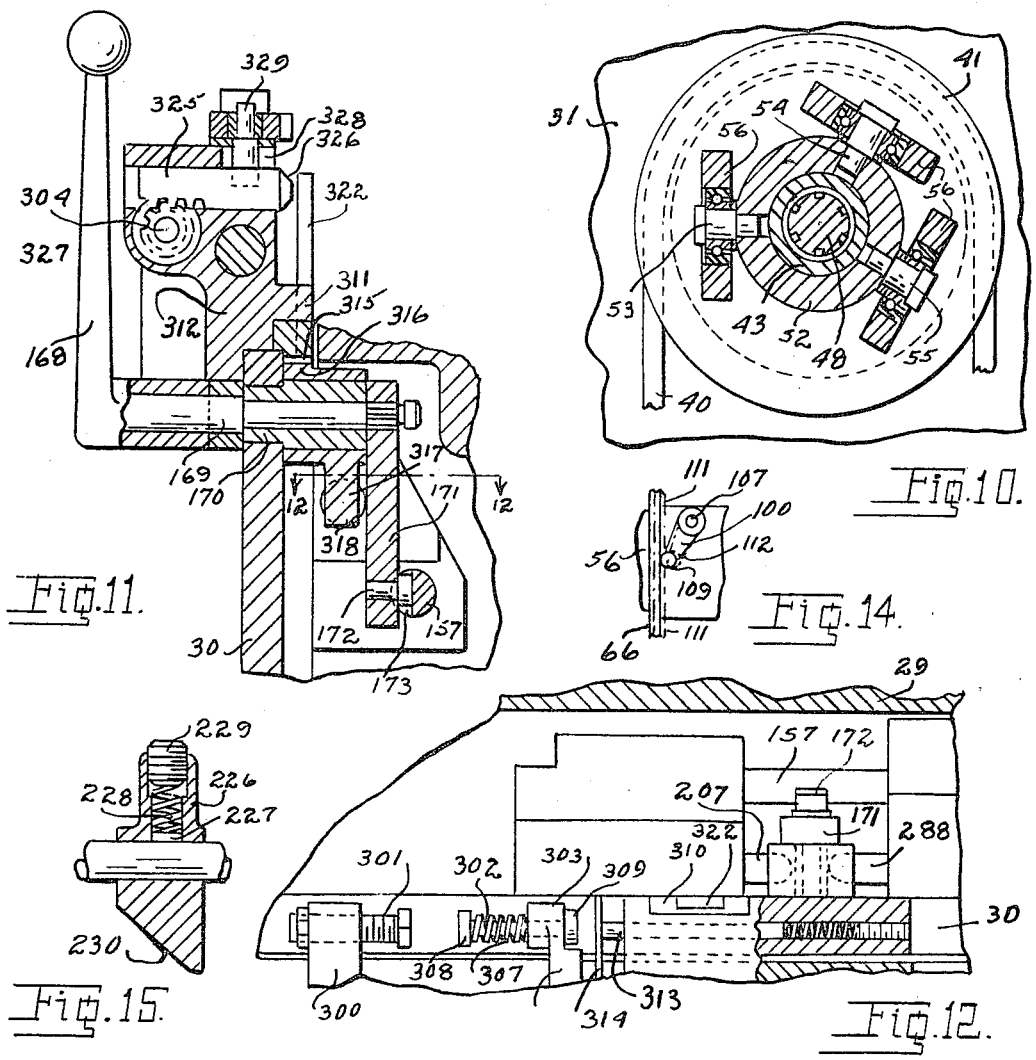
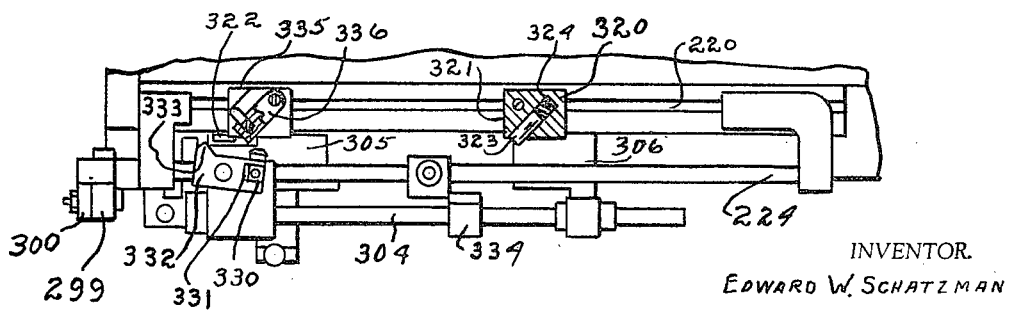

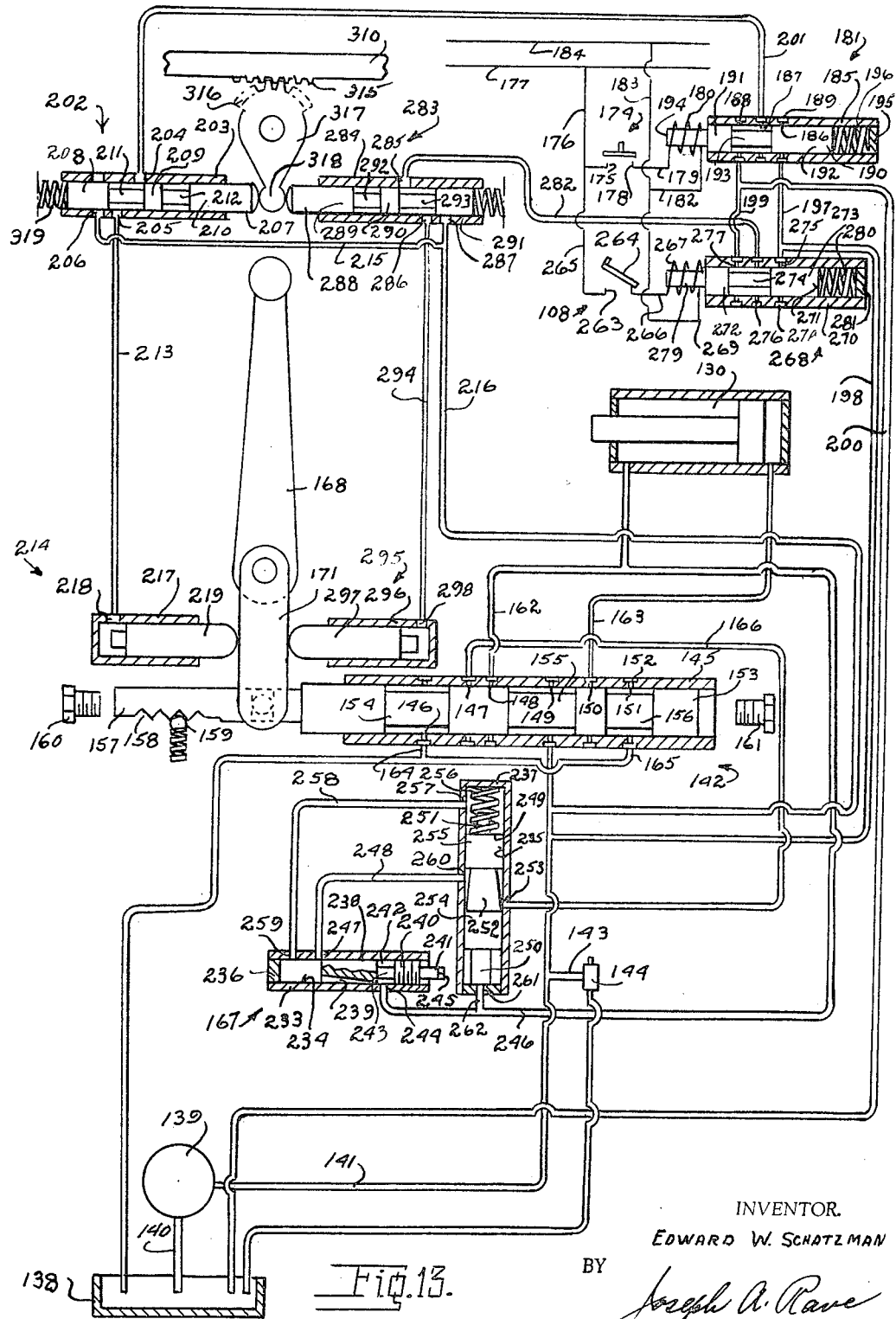

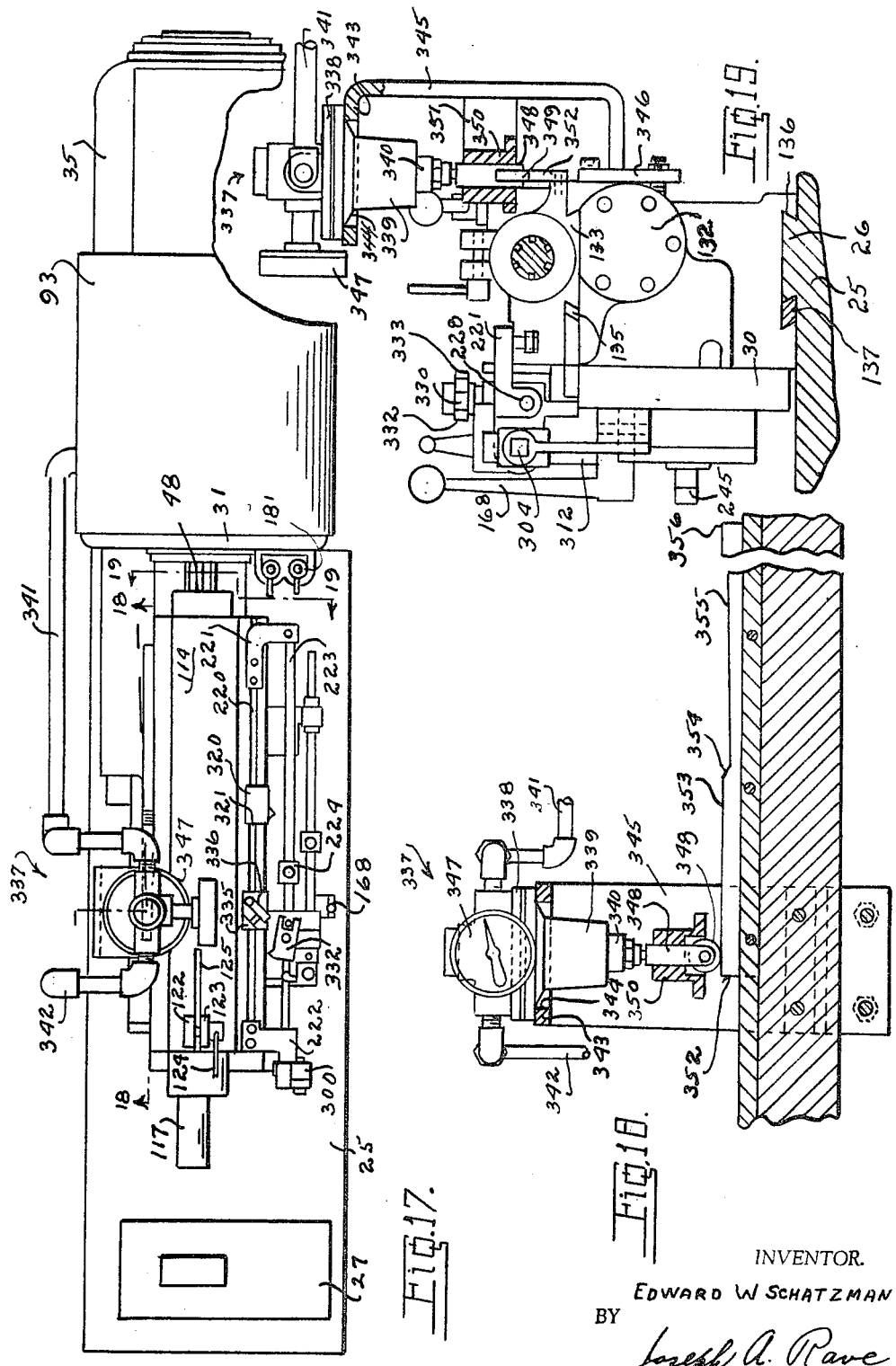

United States Patent Office 3,283,618
Patented Nov. 8, 1966

3,283,618
TORQUE CONTROLLED MACHINE TOOL
Edward W. Schatzman, South Fort Mitchell, Ky., assignor to The Avey Division of the Motch and Merryweather Machinery Co., Covington, Ky., a corporation of Ohio
Filed Aug. 26, 1964, Ser. No. 392,115
10 Claims. (Cl. 77—32.7)

This is a continuation-in-part of application Serial No. 242,312 filed December 4, 1962 and now Patent No. 3,192,802.

This invention relates to improvements in machine tools and particularly to improvements in high speed or sensitive drilling machines. A high speed or sensitive drilling machine implies a drilling machine particularly adapted for small diameter drills and, obviously, said drills can be readily broken in the event of unusual twisting torque thereon. Said small diameter drills are initially made, or formed, to pass chips rearwardly thereof substantially at the instance of production but, frequently the said chips remain in the hole being drilled for thereby resisting rotation and increasing or building up torque on the drill and causing it to break. Torque on these small drills may also be produced through hard spots in the work, swelling of the drill due to friction heat, or for other reasons or causes that can develop during the drilling operation and which torque is generally in excess of that of normal drilling and said excessive torque, as noted above, effects drill breakage.

In the past, devices have been provided to safe-guard the drill against breakage due to the above causes, there being one such device disclosed in United States Patent 2,562,170 which issued on July 31, 1951 in the name of Edward J. Busemeyer for Machine Tool. There is also pending in the United States Patent Office an application for patent of the present inventor Serial No. 242,312 which was filed on December 4, 1962 and was an improvement on said above noted Busemeyer disclosure. While the Busemeyer structure was very successful, the disclosure in the Schatzman application is a considerable improvement thereon. The mechanism of the present application is, in practice, considerably superior to the mechanism of the pending application.

The principal object of the present invention is therefore the provision of a torque control mechanism for use with high speed or sensitive drilling machine spindles that is super sensitive and at the same time readily adjustable to the desired torque load on the drill.

Another object of this invention is the provision of means whose torque yielding point never changes since it is fluid and not subject to failure or pressure other than that indicated due to fatigue of the parts entering into the said control mechanism.

A still further object of this invention is the provision of a torque control mechanism that accomplishes the foregoing objects that can be readily varied due to the immediate necessities and desires of the drill operator and the work presently being produced.

A still further object of the present invention is the provision of a torque control device for use with high speed or sensitive drilling machine spindles that is economical to produce and from which high efficiency and dependability flow while in operation.

A still further and specific object of the present invention is the provision of a torque control device wherein the reacting or control torque device may be automatically varied during the tooling or drilling cycle of the spindle.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a fragmentary, elevational view of a drilling machine having incorporated therewith the torque control mechanism of the present invention.

FIG. 2 is a top plan view of the drilling machine illustrated in FIG. 1.

FIG. 3 is, in effect, an end elevational view of the drilling unit as seen, specifically, from line 3—3 on FIG. 2.

FIG. 5 is a fragmentary, elevational view of a portion of the torque control mechanism as seen from line 5—5 on FIG. 4.

FIG. 6 is an enlarged, fragmentary, sectional view through the tool spindle actuating mechanism as seen from line 6—6 on FIG. 2.

FIG. 8 is a view partly in section and partly in elevation through a portion of the torque mechanism as seen from line 8—8 on FIG. 7.

FIG. 10 is a transverse, sectional view through the torque control device taken through a plane ahead of the plane of FIG. 9 on line 10—10 on FIG. 7.

FIG. 11 is a fragmentary, enlarged, sectional view through the main control lever as seen from line 11—11 on FIG. 1.

FIG. 12 is a fragmentary, sectional view through part of the automatic control means for the machine as seen from line 12—12 on FIG. 11.

FIG. 13 is a diagrammatic view of the hydraulic and electrical control mechanism of the drilling machine described herein.

FIG. 14 is a fragmentary view taken on line 14—14 on FIG. 5 and disclosing a detail in the construction.

FIG. 15 is an enlarged, sectional view through one of the control dogs of the machine as seen from line 15—15 on FIG. 2.

FIG. 16 is an enlarged view of a portion of FIG. 2 and showing the dog control mechanism with certain parts cross-sectioned for clearness in illustration and operation.

FIG. 17 is a top plan view, similar to FIG. 2, of a drilling machine illustrating a modification in the control mechanism of the present invention.

FIG. 18 is an elevational view of a portion of the disclosure in FIG. 17 illustrating the modification in FIG. 17 and as seen from line 18—18 on said FIG. 17.

FIG. 19 is in effect, similar to FIG. 3, an end elevation of the modified drilling unit of FIG. 17, specifically as seen from line 19—19 on said FIG. 17.

Throughout the several views of the drawings, similar reference characters are employed to denote the same or similar parts.

Figures 4, 9:
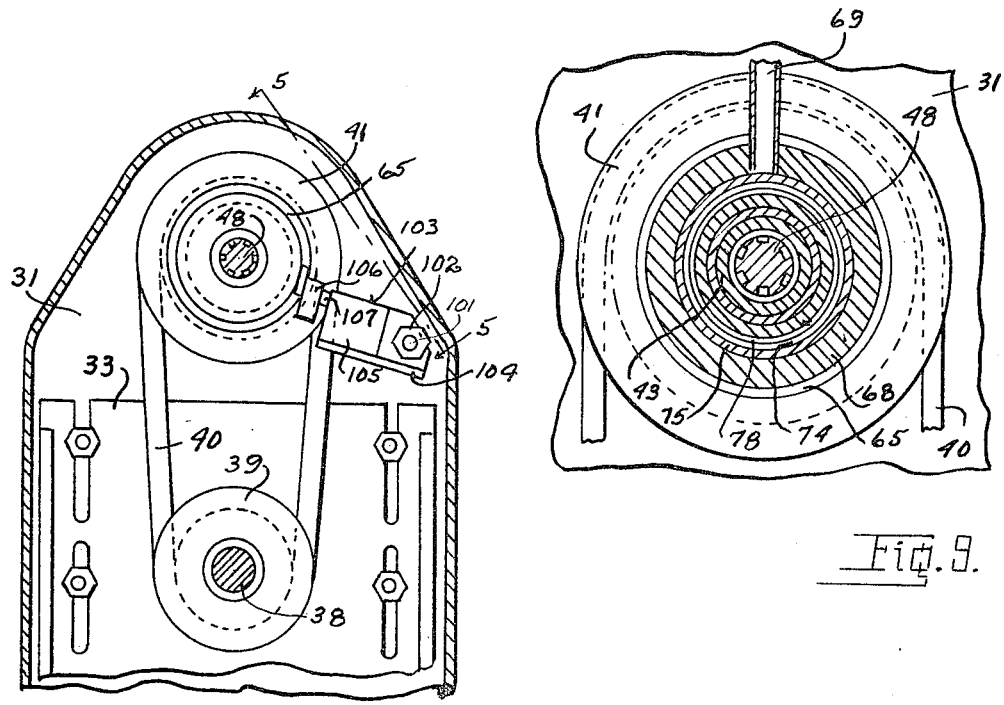
FIG. 4 is an enlarged view partly in section and partly in elevation as seen from line 4—4 on FIG. 1.
FIG. 9 is a sectional view transversely of the torque mechanism as seen from line 9—9 on FIG. 7.

As was noted above, this invention pertains primarily to means or mechanisms for controlling the longitudinal or feed movement of a drill for performing step or deep hole drilling operations, particularly, when the drill used is of small diameter. In the embodiment of the invention herein disclosed there is provided a device, mechanism or machine in which the tool or drill is advanced from an initial position at a rapid rate to the work, fed at a slow rate entirely through, or through a part of, the work and then rapidly retracted. In the event the work is completely drilled, the drill carrier is stopped in its retracted position while if the work is only partially drilled the rapid retraction of the drill carrier is followed by a rapid advance of the drill or tool to the point where it was previously withdrawn for a second drilling step until reversal again takes place. This cycle of operation is repeated until the work is completely tooled or drilled in the event that a single feed cycle of the tool or drill does not complete the work.

As was noted above, the purpose of this type of a control mechanism is to permit the clearing of chips from the holes, if said chips are not automatically cleared by the drill itself, so that said chips do not interfere with the rotation or operation of the tool or drill, or interfere or prevent maintaining the tool or drill in a cool condition. In the case of drilling oil holes in crank shafts this is very important since such drills are of comparatively small diameter and will not stand a great amount of twisting strain or torque. In this instance, the chips may interfere with the rotation of the drill, thereby setting up a torque on the drill in excess to that which it will stand, causing said drills to be twisted and broken.

By the present invention, means are provided whereby this torque, at a point below drill breakage, is utilized for effecting the withdrawal of the drill from the hole.

The machine disclosed in the drawings is a single spindle machine, that is, a machine for drilling one hole at a time, It should be noted, however, that a multiple spindle machine may, and in fact has been, produced in which a plurality of drilling spindles were employed, thereby simultaneously drilling a comparatively large number of holes, such as the oil holes for all of the bearings of a crank shaft as used in a multiple cylinder internal combustion engine, and in which each drilling spindle had incorporated therewith the control means to be presently described.

Specifically, the machine shown in the drawings comprises a base or bed 25 having formed on its upper surface a dovetail guide 26 with said base or bed having mounted thereon a work support 27. Any suitable means (not shown) may be provided for securing and adjusting the work support 27 relative to the base or bed 25 and for clamping the same in position. Mounted on the base or bed upper surface guide 26 is the drilling unit, indicated in its entirety by the reference numeral 28, which includes the relatively hollow body portion or head 29 and a closing plate 30.

The base or bed 25, at its rear end, is provided with an upstanding support 31 to which is secured a motor supporting bracket 32. The motor supporting bracket 32 has a vertical arm 33, disposed against the outer surface of the upstanding support 31, and a horizontal arm 34 on which is secured an electrical motor 35. The motor supporting bracket 32 is vertically adjustable through an adjusting screw 36, carried thereby, and a co-operating nut 37 on the rear surface of the bed upstanding support 31.

Projecting from the motor 35 is the motor shaft 38 which has keyed or otherwise secured to it a pulley 39 for V belts 40. The belts 40 are, in turn, extended around a spindle driving pulley 41, freely rotatable on anti-friction bearings 42 which encircle a spindle sleeve 43, see FIG. 7. The spindle sleeve 43 is journaled in anti-friction bearings 44 and 45 carried by the upper end of the bed upstanding support 31. The spindle sleeve 43 is provided interiorly thereof, for the portion thereof at 46, with suitable driving keys which enter splines 47 in tool spindle 48.

Figure 7:
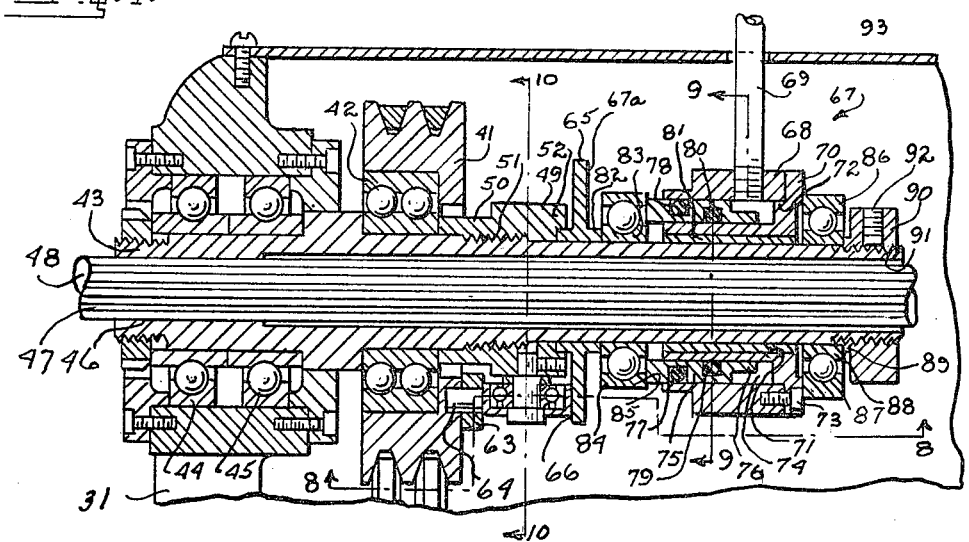
FIG. 7 is an enlarged, sectional view through the spindle driving and torque control mechanism as seen from line 7—7 on FIG. 5.

The spindle driving pulley 41 is substantially cup-shaped and encloses the anti-friction bearing 42. The inner race of the bearing 42 is placed under tension by a nut 49 which has its projecting sleevelike portion 50 in contact with said inner race of the anti-friction bearing 42. The nut 49 is connected with the spindle sleeve 43 through threads 51. The nut 49 includes an enlarged portion 52 which carries the driving means between the said pulley 41 and said spindle sleeve 43. As seen most clearly from FIG. 10 the enlarged portion 52 has projecting, radially, from equally spaced points around its periphery, three being shown, studs 53, 54 and 55 on each of which is mounted a driving cam or dog 56. Each of said cams or dogs 56 is substantially identical, which, as seen in FIGS. 7 and 8, comprises a generally cylindrical member or roller 57 having at one point on its periphery a flat 58. Diagonally opposite the flat 58 the cam or dog 56–57 is provided with a radial shoulder or face 59 which terminates in a downwardly and outwardly inclining cam face 60. Each of the cams or dogs is mounted on its stud 53, 54 or 55 through an anti-friction bearing 61.

Projecting rearwardly from the hub 62 of the spindle pulley 41 is an abutment 63 in the nature of a roller secured to the pulley 41 through a stud 64. There are as many abutments 63 as there are cams or dogs 56. Each abutment 63 is positioned on the pulley 41 to engage a wear stud carried by the radial shoulder 59 of its cam or dog roller 57, as seen clearly in FIG. 8.

Rearwardly of the nut 49 and surrounding the spindle driving sleeve 43 is a plate 65 having its forward surface 66 engaging, simultaneously, on the flats 58 of each of the cams or dogs 56 with said parts, that is, the flat face 66 of the plate 65 and flats 58 of the cams or dogs 56, held in operative contact by a mechanism or means, the torque control mechanism of the present invention, indicated in its entirety by the reference numeral 67.

The torque control mechanism or means 67 comprises a cylindrical member, actually a piston cylinder 68, which is concentric to the spindle sleeve 43 and outwardly or to the right of the plate 65 and with said piston cylinder 68 retained against rotation by a pipe 69, for a purpose subsequently made clear, see FIG. 7.

The torque control mechanism piston cylinder 68 has its one end closed by a cylindrical flange 70 at one end of a sleevelike member 71. Said sleevelike member 71 is provided at its end inwardly of the flange 70 with a circular shoulder 72 to the diameter of the piston cylinder 68 and which circular shoulder 72 positions the said piston cylinder on the flange 70. The said piston cylinder 68 and inner sleeve 71 are secured to one another for unitary operation by cap screws 73 extending through the flange 70 into the adjacent end of the piston cylinder 68.

The interior diameter of the piston cylinder 68 is somewhat greater than the external diameter of the sleeve 71 thereby providing between said diameters a space, or piston cavity, 74 in which is disposed a piston 75.

The piston 75 is essentially a ring having at its inner end a reduced diameter portion 76 so that the piston body or external diameter thereof, when in its fully retracted position, cannot block off the flow through the pipe 69. In order to prevent leakage around or along either the external diameter or the internal diameter of the piston, or sleeve, 75 use is made of piston rings, appropriately ring washers.

Particularly, and as seen in FIG. 7, the piston 75 is provided, inwardly of its outer end and downwardly of its exterior surface with a groove 77 in which is disposed the piston ring 78 which is such as to closely engage the inner diameter of the piston cavity in the piston cylinder 68. Similarly the said piston 75 is provided inwardly of its inner end and upwardly of its inner diameter with a groove 79 in which is disposed a piston ring 80, which, similarly to the piston ring 78, is to such a dimension or diameter as to closely engage the exterior diameter of the sleeve 71.

Since, as noted above, this torque responsive mechanism is mounted on the spindle sleeve 43 and held stationary while the spindle 43 is rotated the said sleeve 71 has pressed thereinto a bushing 81 which constitutes the bearing in which the said spindle sleeve rotates.

The said torque control mechanism or means 67 is mounted, in effect, on anti-friction bearings with regard to the said spindle sleeve 43 and which mechanism is as follows:

The plate 65 has projecting rearwardly thereof, that is toward the said torque control mechanism or means 67, from its second flat face 67a, a hub 82 which has face contact with the adjacent face of the inner race 83 of a ball bearing indicated in its entirety by the reference numeral 84. The ball bearing 84 has its outer race 85 in face contact with the inner face of the piston ring 75.

The piston cylinder 68 has the outer face of its closure head 70, above referred to as a flange, in face contact with the outer race 86 of a second ball bearing 87 and which ball bearing has its inner race 88 in face contact with a circular, or sleevelike, projection 89 on a clamping nut 90. The clamping nut 90 is connected with the spindle sleeve 43 through threads 91 and the said nut is clamped or secured to the sleeve after adjustment through a dog screw 92.

From the foregoing, and as particularly illustrated in FIG. 7, the torque control mechanism or means 67 is secured to the spindle sleeve 43 through the ball bearings 85 and 87 yet held against rotation since the spindle sleeve 43 may rotate within the bushing 81 and carry with it the inner races 83 and 88 of the ball bearings 85 and 87 and wherefore no interference is offered to the rotation of either the spindle sleeve 43 or the spindle itself keyed to the said spindle for operation therewith.

The pipe or conduit 69, as seen in FIG. 2, extends from the piston cylinder 68 outwardly thereof through a sheet metal cover 93 which is carried by the upstanding body plate 31 to enclose the spindle drive mechanism and its torque control device, to the rear of the machine. Said pipe or conduit 69 extends along the rear of the machine toward the left where it is connected through a suitable union or coupling with the outlet pipe 94 of an air pressure regulator, indicated in its entirety by the reference numeral 95. Since an air pressure regulator is well-known and available in various designs on the open market it is not further illustrated or described herein.

The said air pressure regulator 95 is provided with an indicating dial 96 and suitable means whereby the pressure through the said regulator may be varied in accordance with conditions of use. The said indicator 96 includes a dial face relative to which a pointer operates in indicating the actual or maximum pressure passing therefrom. In addition the air pressure regulator 95 has extending therefrom an intake pipe or conduit 98 which, as indicated in the drawings in FIG. 2, extends to an air pressure source available at the point of use of the drilling machine of the present invention.

In operation the air regulator 95 is adjusted until its indicating pointer or finger 97 registers in pounds per square inch or, as will later be made clear, the amount of pressure applied to the drill during its drilling operation.

As seen in FIG. 3 the air pressure regulator 95 is secured to an arm 99 in turn connected through an arm 100 with the main casting or tool head 29.

It will be obvious that by adjusting the air pressure regulator the air pressure in the piston cylinder 68 and against the piston 75 will be increased or decreased and this adjustment is effected in the interest of full automatic production while obtaining the maximum results from the tool or drill being used. In other words, and as will subsequently be made clear, the increases in torque on the drill to a point approaching the unsafe limit will automatically effect a retraction of the drill from its drilling operation for any of the reasons above set forth.

Outwardly projecting from the bed upstanding support plate 31 is a stud 101 having secured to its outer end, as by nuts 102, an angle bracket 103. One leg 104 of the angle bracket 103 has secured to it a micro-electric switch 105 which has pivoted thereto one end of an arm 106. In effect, the arm 106 is secured to an oscillatable or rotatable spindle 107 which actuates a movable switch contact within the microswitch, not shown, except diagrammatically in FIG. 13, where said switch is indicated in its entirety by the reference numeral 108. The other end of the arm 106 is provided with a roller 109 which rides on the outer flat surface 67a of the plate 65, as clearly illustrated in FIGS. 4 and 5.

The motor 35 rotates in a clockwise direction which through the belts 40 correspondingly rotates the spindle driving pulley 41. The rotation of the spindle driving pulley 41 in a clockwise direction is to the right as seen in FIG. 4 wherefore the abutments 63, from said pulley 41, will each engage its driven cam or dog 56 through their shoulders or vertical faces 59 to correspondingly rotate the nut 49 and thereby the spindle driving sleeve 43. The position of the parts illustrated in FIGS. 1 and 5 is the normal or idle position and upon initial rotation of the spindle sleeve pulley 41 the cams or dogs 56 are slightly rotated about their individual studs 53, 54 and 55 to the position shown in solid lines in FIG. 8. In other words the flats 58 of each cam or dog 50 is slightly tilted from the vertical to a downwardly and inwardly inclined position as seen in FIG. 8 in solid lines which causes a slight retraction of the piston 75 to its proper operating position. It is in this position of the parts that the spindle is being rotated during a drilling operation. The parts will be held in this position so long as the drill is freely cutting and has no torque or sticking pressure thereon greater than that which can be withstood by the drill and to which point the mechanism is obviously adjusted.

Should, for some reason, the torque on the drill be increased, due to the gathering of chips in the hole being drilled, or a swelling of the drill due to friction heat, or for any other reason, and a resistance be set up to drill rotation, the driving spindle sleeve will tend to slow down in its rotation thereby tending to correspondingly hold back the rotation of the spindle driving pulley 41. Since the said spindle driving pulley is being constantly driven through the belts 40 the abutments 63 will constantly turn and will thereby cause the cams or dogs 56 to be rotated or oscillated about their respective studs 53, 54 and 55 from the solid line position of FIG. 8 to the phantom line position 110 thereof and will thereby shift the plate 65 from its solid line position in FIG. 8 to its phantom line position, indicated by the reference numeral 111, and correspondingly actuate the micro-switch arm 106 from its solid line position to its phantom line position 112 in FIG. 14. This immediately closes the contacts of the microswitch to operate the control mechanism, to be later described, and withdraws the drill from the work.

From the foregoing it will now be appreciated that there has been provided a compressive drive connection between a source of power and the spindle and which drive connection compresses on excessive pressure on the drill due to an increase in torque thereon. It will further be appreciated that by adjusting the pressure or compressible limit in this compressive drive, the point of drill breakage can be so utilized that the drill is withdrawn in ample time to prevent the occurrence of drill breakage. It will further be appreciated that a high speed or sensitive drilling machine equipped with the compressive drive just described will perform drilling operations of the step drilling type and the actual drilling performed until the point of breakage of the drill is nearly reached instead of withdrawing the drill when no danger exists.

The spindle 48 is mounted for rotation, at its outer end, in a quill 113 disposed for axial adjustment in a bore in a spindle carrier 114, see FIG. 6. The inner end of the spindle carrier 114 carries an anti-friction bearing 115 for the spindle 48. The other end of the spindle is mounted in an anti-friction bearing 116 carried by the quill 113 with the spindle projecting beyond the quill and provided with the usual chuck 117 for the drill or other tool.

The spindle 48 is axially adjustable relative to the carrier 114 by means of a rack pinion 118 carried by a shaft 119 rotatably journaled in the carrier 114. The rack pinion 118 meshes with a rack 120 formed integral with or secured to the quill 113. In order to rotate the pinion 118, its shaft 119 projects above the forward end of the carrier 114 and has secured thereto a crank or the like 121. The outer end of the carrier is split, and on each side thereof is a lug or ear 122 and 123, see FIG. 2, respectively provided with a tapped and a plane perforation receiving a clamping stud 124. This clamping stud draws the portions of the carrier on each side of the split 125 toward one another and thereby clamps the quill in adjusted positions.

The spindle carrier, and therefore the parts carried thereby, is actuated by hydraulic means toward and from the work, which means, as shown in FIG. 6, comprises a downwardly projecting lug 126 from the carrier 114 which has a perforation therein receiving the outer, reduced end 127 of a piston rod 128. The piston rod 128 has secured to its inner end a piston 129 which is movable through a cylindrical bore 130 in the tool head 29.

In order to prevent loss of fluid and pressure around the piston rod at its outer end, use is made of a suitably packed joint 131 carried by the outer end of the cylindrical bore 130. The inner end of the cylinder 130 is likewise suitably closed, as by a head 132.

The spindle carrier 114 is guided in its movement relative to the tool head 29, see FIG. 3, by means of a dovetailed guide 133 received in a correspondingly shaped guide-way 134 with a gib 135 between one side of the guide and the adjacent side of the guide-way. The tool head 29 is provided in its lower side with a dove-tailed guide-way 136 receiving the correspondingly shaped guide 26 formed, as noted above, on the upper surface of the bed 25. A gib 137 is disposed in the guide-way 136 between one side of the guide tongue 26 and the opposed side of said guide-way 136 for clamping the head in position on the said bed 25.

As was noted above, hydraulic or fluid means is preferably employed for actuating the piston 129, and therefore the spindle carrier, toward and from the work. This hydraulic mechanism is shown diagrammatically in FIG. 13 to which reference is now to be had, and the various valves and control means will be described in detail with reference to their diagrammatic disclosures and their structural illustrations in the other figures of the drawings, if their importance so requires, as they are encountered in a complete cycle of operation of the machine.

As shown in FIG. 13, use is made of a tank or sump 138, which may be independent of the machine, though preferably is formed in some part of the bed, such as in the lower portion thereof. Mounted above the tank or sump 138 is a constantly rotating pressure circulating pump 139 having its intake or suction side connected by a pipe 140 with the fluid in the sump or tank. The discharge side of the pump has extending therefrom the pressure pipe or conduit 141, terminating in the main control mechanism or valve indicated in general in FIG. 13 by the reference numeral 142. The pressure pipe or conduit 141 has connected therewith a branch pipe or conduit 143 which terminates in the sump or tank 138 with said branch pipe or conduit having intermediate its ends an adjustable relief valve 144. The relief valve 144 determines the actuating pressure in the hydraulic system.

The main control valve 142 is diagrammatically illustrated in FIG. 13 as comprising a valve sleeve 145 which in practice is pressed into a valve block secured to the inner face of the head closure plate 30 which closes the open front side of the tool head 29, this mechanism is not structurally shown as it is only specifically incidental to the invention. The valve sleeve 145 has formed therethrough and radially thereof a plurality of sets of radial ports 146, 147, 148, 149, 150 and 151, each set of ports being encircled by a similar groove 152 formed circumferentially in the exterior of the sleeve 145. Disposed in the bore of the valve sleeve 145 is a spool type valve member 153 provided with reduced portions or cannelures 154, 155 and 156 adapted in different positions of adjustment to variously connect the several sets of ports in the valve sleeve 145.

The valve member 153 has four operative positions, and in order to determine these positions, it has projecting therefrom a stem 157 provided with V-shaped notches 158 co-operating with a spring pressed detent 159 carried by a suitable block which is secured to the inner face of the head closure plate 30, and therefore projects into the interior of the tool head 29. The position of the valve member 153, illustrated in the drawings, is the neutral or stop position, and the valve has a position to the left of that shown in FIG. 13, which is the retracting position. In order to limit the movement of the valve to the left in FIG. 13 use is made of a stop screw 160 that may be mounted on the block carrying the detent with said stop screw in alignment with the axis of the valve stem 157. A third position of the valve 153 is to the right of that shown in FIG. 13 which is the slow feed position to cause the tool to feed slowly through the work while a cut, that is, a hole being drilled, is being effected. The fourth position of the valve is to the extreme right in FIG. 13 which is the rapid advance position to cause a rapid approach of the tool to the work. This fourth position is finally determined by a stop screw 161 threaded into an appropriate fixed part of the tool head 29 and, again, in axial alignment with the valve, as diagrammatically illustrated.

As seen in FIG. 13, the radial ports 148 and 150 have, respectively, connected with them one end of pipes or conduits 162 and 163 which respectively terminate at ports located at inner and outer ends of the piston cylindrical bore 130. The ports 149 have connected therewith the outer end of the main pressure pipe or conduit 141, while the ports 146 and 151 have connected therewith pipes or conduits 164 and 165 which terminate in the sump or tank 138 and are, therefore, the return lines for the system from the main control valve mechanism. The remaining set of ports 147 of the piston valve sleeve 145 has connected therewith one end of a pipe or conduit 166 which terminates in a feed determining and balance valve mechanism, indicated in general in FIG. 13 by the reference numeral 167, and which will be later further described.

At the commencement of a tooling cycle, the valve 153 may be manually shifted by means of a lever 168, see FIGS. 1 and 2, which is keyed or otherwise secured to the outer projecting end of a shaft 169 oscillatably journaled in a bushing 170 carried by the tool head cover plate 30. The inner, projecting, end of the shaft 169 has keyed or otherwise secured to it a lever 171 having at its free end a valve shifting pin 172 received in a slot 173 formed in the valve stem 157. This initial shifting of the valve member 153 is to the extreme right in FIG. 13 for thereby connecting the pressure ports 149 with the ports 150 and causing a flow of fluid from the conduit 141 to the conduit 163, and therefore the outer end of the cylinder 130 for actuating the piston 129 outwardly together with the parts connected therewith. The fluid ahead of the piston 129 is at this time being exhausted by way of pipe or conduit 162 to the ports 148 and to the pipes or conduits 164 and 165 by way of the ports 146 to the sump or tank 138. As was noted above, this movement of the piston and parts connected therewith is at a rapid rate in an outward direction or toward the work.

The starting of cycle of operation of the machine, the initial shifting of the valve member 153, instead of through the manually operated lever 168 is preferably effected through the closing of an electric starting switch, indicated by the reference numeral 174 and mounted on the forward face of the head closure plate 30. It is understood that this switch 174 may be, and frequently is, mounted on a control panel that may be remote from the machine.

As further seen in FIG. 13 the switch 174 has its one contact 175 connected by an electrical conductor or wire 176 with one wire 177 of the main electric circuit. The switch 174 has its other contact 178 connected by a wire 179 with one end of a solenoid coil 180 associated with a hydraulic valve indicated in its entirety by the reference numeral 181. The other end of the solenoid coil 180 is connected by wires 182 and 183 with the second wire 184 of the main electrical circuit.

The valve 181 may be termed the starting valve and is shown mounted in operative position in FIG. 1 and as shown in said FIG. 1 said valve 181 along with its solenoid coil are mounted against the forward face of the base or bed upstanding support 31.

As shown diagrammatically in FIG. 13 the starting valve 181 comprises an enclosing sleeve 185 having formed radially therethrough a plurality of sets of ports 186, 187 and 188 with each set of ports connected by a groove 189 exteriorly of the sleeve 185.

Disposed within the valve sleeve 185 is a spool type valve member 190 having at its ends spools 191 and 192 connected by a reduced portion or cannelure 193 adapted to alternately connect ports 186 and 187 and 187 and 188. The valve member 190 has projecting from one end thereof a stem 194 which constitutes the movable core for the solenoid coil 180. One end of the valve sleeve 185 is closed as at 195 and said closure forms one abutment for a compressible coil spring 196 which normally centralizes the valve 190 at its normal position.

The valve sleeve 185 has its ports 186 connected with one end of a pipe or conduit 197 in turn having connected therewith one end of a pipe or conduit 198 that extends from the main pressure line or conduit 141 while the ports 188 of said valve sleeve 185 have connected therewith one end of a pipe or conduit 199 in turn having connected therewith one end of a pipe or conduit 200 that terminates in the sump or tank 138.

The remaining set of ports 187 of the valve sleeve 185 has connected therewith one end of a pipe or conduit 201 terminating at its other end in a pilot valve mechanism indicated in its entirety by the reference numeral 202.

From the foregoing it should be noted that the closing of the starting switch 174 energizes the solenoid coil 180 for shifting the starting valve member 190 against the resistance of spring 196 and connecting the hydraulic pressure from the main pressure pipe or conduit 141 through the pipes or conduits 198 and 197 to the pipe or conduit 201 and therefore to the pilot valve 202.

The pilot valve 202 is carried by a valve block on the inner surface of the head closure plate 30 and, as diagrammatically illustrated in FIG. 13 comprises a valve sleeve 203 having formed radially therethrough a plurality of ports 204, 205 and 206. Disposed within the valve sleeve 203 is a spool type valve and plunger member 207 having thereon spool portions 208, 209 and 210 with said spool portions 208 and 209 connected by a reduced portion or cannelure 211 and said spool portions 209 and 210 similarly connected by a reduced portion or cannelure 212.

The pilot valve sleeve 203 has connected with its ports 204 the other end of the pipe or conduit 201 while the ports 205 have connected therewith one end of a pipe or conduit 213 having its other end connected with a valve shifter mechanism indicated in its entirety by the reference numeral 214 which effects the shifting of the main valve member 153. The remaining set of ports 206 in the pilot valve sleeve 203 has connected therewith one end of a pipe or conduit 215 having its other end connected with a pipe or conduit 216 that terminates in the main pressure pipe or conduit 141.

The valve shifting mechanism 214 is carried by the head closure plate 30 to be interiorly of the head 29 with said valve shifter mechanism including a cylinder 217 closed at one end and provided with a port 218 with which the other end of the pipe or conduit 213, supra, connects. Disposed within the cylinder 217 is a piston plunger 219 adapted to have its inner end subjected to hydraulic pressure within the closed end of the cylinder 217.

The piston plunger 219 projects outwardly of the cylinder 217 and has contact with the valve shifting lever 171 which as noted above has a pin and slot connection with the main valve 153 for actuating the same.

From the foregoing, it will now be noted that the operation of the starting valve member 190 through the closing of the starting switch 174 and the connection of the hydraulic pressure with the pilot valve 202 has the said pressure connected with the pipe or conduit 217 and the piston plunger mechanism 214 for thereby actuating piston plunger 219 and through the lever 171 shifting the main control valve member 153 to its extreme right hand position so that the rapid advance movement is imparted to the tool or drill carrier, the same as above set forth with respect to the manual operation of lever 168. It should be noted that the lever 168, for a purpose subsequently to be made clear, is at the same position whether manually effected or mechanically effected by the piston plunger 219.

The rapid advance movement of the carrier continues until the drill or tool is about to strike the work, whereupon this movement is changed to a relatively slow feed rate of movement. In order to accomplish this, the spindle carrier 114 is provided therein with a T-shaped slot 220, see FIG. 3, which extends the length of the carrier and has secured therein at its inner end a bracket or arm 221, and at its outer end a bracket or arm 222, see FIG. 2. Carried by the brackets or arms 221 and 222 is a rod or bar 223, shown in the drawings as of angular cross-section. Mounted on this rod is the cumulative rapid traverse stop dog 224 which, as seen in FIG. 1, is provided with a cam shaped nose 225 on one side of the rod 223, and as seen in FIG. 15 with a cylindrical boss 226 on the other side of said rod 223. The boss 226 is hollow to accommodate a friction shoe 227 backed up by a spring 228 whose tension may be adjusted by screw 229. The cam nose 225 provides an inclined cam face 230 operable to change the rapid movement of the tool carrier to a slow feed movement as will now be made clear.

The manual control lever 168 has projecting from one side thereof a finger 231 having a cam face 232 at such an angle as to be engaged by the cam face 230 of the cumulative stop dog 224. When the cycle of operation was started, whether by manually actuating the lever 168 or by power shifting the main control valve 153, the said lever 168 was actuated to the left thereby upwardly shifting the lever finger 231 from the position illustrated in FIG. 1. This operation placed the finger cam face 232 in the path of movement of the cam face 230 of the cumulative stop dog 224, and at the same time shifted the main control valve 150 to its extreme right hand position. During the advance of the carrier the cumulative stop dog cam face 230 engages the lever finger cam face 232 and actuates the said lever to a position for shifting the main valve to the feed position, that is, to a position intermediate its neutral or stop position illustrated in FIG. 13 and its extreme right hand or rapid advance position.

From this, it will be seen that the cumulative rapid traverse stop dog 224 is adjustably positioned on the rod 158 to engage the lever finger 231 at the point where the drill or tool is about to engage the work. The oscillation of the lever 168 is in a clockwise direction, as seen in FIG. 1, through the shaft or stud 169 and arm 171, shifts the valve member 153 to a position for cutting off the flow of the exhaust fluid through the pipe or conduit 162 and therefore the unrestricted port 148. This flow is directed, instead, from the pipe or conduit 162 to the feed rate determining and balance valve, referred to above, and indicated in general in FIG. 13 by the reference numeral 107.

This feed determining and balance valve 167, as shown diagrammatically in FIG 13, contemplates a suitable valve block 233, see FIG. 1, carried by the head closure plate 30 to project into the interior of the head 29. The said valve block, as diagrammatically illustrated in FIG. 13, would be provided therethrough with a pair of bores 234 and 235, one for the feed valve the other for the balance valve, each of which bores is closed at one end as at 236 and 237, respectively. Disposed in the valve bore 234, shown in FIG. 13 as a sleeve, is a valve member 238 having an inclined groove 239 formed longitudinally in one side thereof. The valve member 238 is provided adjacent one end of its groove with an enlarged threaded portion 240 threaded into the valve bore 234, while the other end of said groove opens into the said bore 234. Projecting from the threaded portion 240 is the valve stem 241, having its end provided with a portion to receive a suitable wrench, key, or the like, whereby the valve may be turned to effect its adjustment through its enlarged threaded portion 240.

The most shallow portion of the groove 239 is adjacent to a chamber 242 formed by a reduced portion 243 in the valve member 238 and this reduced portion establishes the minimum rate of flow through the groove, and therefore the slowest rate of feed of the tool carriage. The valve bore 234 is provided with several ports, one of which ports 244, co-operates with the groove and depending upon the position of the groove with regard to the said port 244 depends the rate of feed movement. In order that the valve 238 may be adjusted to variously position its groove 239 with respect to the port 244 the valve stem 241, as noted above, is provided with an end of angular cross-section 245.

In practice this valve stem 241 and its end 245 may project outwardly of the head closure plate as seen in FIG. 1.

The valve bore port 244 has connected therewith one end of a pipe or conduit 246 which terminates at its other end in the pipe or conduit 162 from the outer end of the piston cylinder 130.

The feed determining valve bore 234 has a second port 247 with which is connected one end of a pipe or conduit 248 that terminates at its other end in the balance valve bore 235 in which is disposed the balance valve mechanism, to be presently described, and with said port 247 located at the outer end of the feed valve member 238.

The balance valve mechanism comprises a valve member 249 disposed, as noted above, in the valve bore 235 and which valve member has reduced stem portions 250 and 251 at opposite ends thereof, together with a reduced portion 252. This reduced portion controls flow through a port 253 and with which is connected one end of the pipe or conduit 166 from the main valve mechanism 142.

The balance valve member 249 is illustrated as having spool portions 254 and 255 respectively having outwardly extending therefrom the valve stems 250 and 251 and with said spool portions having the reduced portion 252 between them. Surrounding the stem 251 is a spring 256 which abuts on one end with the spool 255 and on the other end with the valve bore end closure 237.

The balance valve bore 235 has extending therefrom a port 257 with which is connected one end of a pipe or conduit 258 that terminates at its other end in a port 259 in the feed valve bore 234. The said pipe or conduit 258 connects the outer ends of the valve bores 234 and 235, namely, the portion of the valve bore 234 ahead of the valve member 238 and the portion of the valve bore 235 in which is disposed the balancing spring 256. It should be noted at this time that the pipe or conduit 248 from the valve bore 234 is from the portion of the bore ahead of the valve member 238 and terminates in a port 260 in the valve bore 235 at the portion thereof including the reduced portion 252 of the valve member 249. The valve bore 235 has a port 261 from the portion thereof in which is disposed the stem 250 of the valve member 249 and with said port 261 having connected therewith one end of a pipe or conduit 262 that terminates at its other end in the pipe or conduit 246 which in turn extends from pipe or conduit 162, supra.

As was noted above the feed valve member 238 is adjusted so that the desired point in its inclined groove 239 effectively empties into the space 242 around the said valve member reduced portion 240 and thereby the port 244 to feed the tool carrier and tool at the desired speed. The balance valve member 249 is for the purpose, as is well known, to maintain a constant flow of the hydraulic medium as determined by the aforementioned setting of the feed valve member 238.

Briefly, the operation of the balance valve in conjunction with the feed valve is as follows:

The flow from the exhaust pipe or conduit 162 from the cylinder 130, when the tool is moving at a feed rate, is by way of the pipes or conduits 246 and 262 to the cannelure space 242 and to the portion of the valve bore 235 that encloses the valve stem 250 where such pressure acts on the balance valve member 249 for actuating it against the resistance of spring 251 while at the same time there is flow through the groove 239 of valve member 238. The flow through the groove 239 is into the valve bore portion 234 ahead of the valve member 238 and then through ports 247 and 259 and through conduits 248 and 258. The flow through the pipe or conduit 258 into the portion of the valve bore 235 that enclosed the spring 256 combines with the force of said spring 256 for positioning the valve member 249 to act against the pressure in the portion of the valve bore 235 that encloses the valve stem 250. These pressures balance one another for positioning the valve member 249 for more or less opening the port 253 and controlling the flow through the pipe or conduit 166 and therefore maintaining and controlling the rate of feed of the tool carrier as set up by the positioning of valve member 238. The flow through the pipe or conduit 166 to the main control valve is connected with the pipes or conduits 164 and 165 and the sump or tank 138.

The slow feeding movement of the tool continues until the tool carrier is reversed for withdrawing the tool from the work. The reversal of the tool carrier may be accomplished through either of two instrumentalities, either after the work has been completely drilled or when the torque on the drill reaches a point near the safe torque load on the drill.

Since the compressive or torque drive on the spindle and its control mechanism have been previously described its connection with the operating mechanism, as diagrammatically illustrated in FIG. 13, will first be defined.

Within the housing of the micro-electric switch 105 is a fixed contact 263, see FIG. 13, and a movable contact 264, said movable contact is operated by the oscillatable stud 107, supra. The fixed contact is connected by a wire 265 to the wire 176 and therefore the wire 177 of the electric source. The movable contact 264 is connected by a wire 266 with one end of a solenoid coil 267 associated with a valve mechanism that may be termed a rapid reverse valve and indicated in its entirety by the reference numeral 268. The other end of the solenoid coil 267 is connected by a wire 269 with the wire 183 from the main electric source wire 184.

The valve 268 is quite similar to the starting valve 181, above described, and is mounted, preferably, adjacent the said starting valve on the forward face of the bed upstanding support 31. The said valve 268 comprises a valve sleeve 270 having therein a valve member 271 of the spool type and including spool portions 272 and 273 with a reduced portion or cannelure 274 between said spool portions.

The rapid reverse valve sleeve 270 is provided with a plurality of sets of ports 275, 276 and 277 with each set of ports connected by a circumferential groove 278 in the exterior of the sleeve 270. The ports 277 and 276 are connected with one another through the cannelure 274 when the valve member 271 is in its normal position, said position being illustrated in FIG. 13, and said ports 276 and 275 being connected with one another when the said valve member 271 is shifted to its second position.

The valve member 271 is shifted to its second position by the solenoid coil 267 and for which purpose the valve member 271 has projecting from one end thereof a stem portion 279 which acts as the core for the solenoid coil 267. The valve member 271 is retained in its normal position by a spring 280 disposed within the valve sleeve 270 and abutting on one end with the said valve member 271 and on the other end with the valve sleeve closure member 281.

The rapid reverse valve sleeve ports 277 have connected therewith the other end of the pipe or conduit 199 from the starting valve sleeve 185 and since the said pipe or conduit 199 has connected therewith one end a pipe or conduit 200 the said ports 277 are connected with the sump or tank 138. The ports 275 of the valve sleeve 270 have connected therewith the other end of the pipe or conduit 197 from the starting valve sleeve 185 and since said pipe or conduit 197 has connected therewith one end of pipe or conduit 198 the said ports 275 are connected with the main pressure pipe or conduit 141 and therefore the hydraulic pump.

The remaining ports 276 of the valve sleeve 270 have connected therewith one end of a pipe or conduit 282 which terminates at its other end in a pilot valve indicated in its entirety by the reference numeral 283. The pilot valve mechanism 283 is quite similar in its construction and operation to the pilot valve 202 above described. The said pilot valve mechanism 283 includes a valve sleeve 284 having formed radially therethrough ports 285, 286 and 287 and it is with the ports 285 that the other end of the pipe or conduit 282 connects.

Within the valve sleeve 284 is a spool type valve and plunger member 288 having spool portions 289, 290 and 291 with said spool portions having reduced portions or cannelures 292 and 293 between them.

The valve sleeve 284 has connected with its ports 287 one end of the pipe or conduit 216 which has its other end connected with the main pressure pipe or conduit 141. The remaining ports 286 of the valve sleeve 284 have connected therewith one end of a pipe or conduit 294 which has its other end connected with a piston plunger mechanism 295 substantially similar to the piston plunger mechanism 214 above described.

The piston plunger mechanism 295 comprises a sleeve or cylinder 296 in which is disposed a piston plunger 297 that has its outer end in contact with the valve actuating link or arm 171. The piston plunger sleeve or cylinder 296 is provided with a port 298 with which is connected the other end of the pipe or conduit 294.

From the foregoing, it will now be seen that slowing down of the spindle 48 due to an increase in torque on the drill or other tool which causes the closing of the micro switch contacts 263 and 264 will operate the solenoid 267 and thereby shift the main control valve mechanism 142 to the left, as seen in FIG. 13, and effect thereby a rapid retraction of the piston 129 and parts connected thereto. It is believed obvious that the shifting of the main valve mechanism 142 will effect this operation since the pressure in pipe or conduit 141 will be connected with the pipe or conduit 162 and the outer side of the piston 129. The exhaust fluid from the other side of the piston 129 flows through pipe or conduit 163 to the pipe or conduit 165 and the sump 138.

The rapid retraction of the spindle carrier and parts associated therewith continues until the carrier is reversed to again forwardly advance to work drilling position. The means and mechanism disclosed in the drawings for effecting this reversal includes a collar 299, secured to the outer end of the dog rod 223. The collar 299 has pivotally connected with it an arm 300 carrying an abutment pin 301 adapted to engage the outer end of a pin 302, illustrated most clearly in FIGS. 1 and 12. The pin 302 is mounted in a cylindrical portion or housing of a lever or arm 303 pinned or otherwise secured to an oscillatable rod 304. The rod 304 is journaled for oscillation at its inner end in a bracket 305 carried by the tool head closure plate 30, and is further journaled at its outer end in a bracket 306, likewise carried by the tool head closure plate 30. As will be seen from FIG. 12, the lever or arm 303 has abutting it one end of a coil spring 307 that surrounds the pin 302 and said spring 307 at its other end abuts with the head 308 of the pin 302 for maintaining a collar 309 on the pin in its normal operative position. The normal position of the pin 302 is in line with the pin 301 and a valve actuating slide 310, which it, in effect, engages during the retracting or withdrawal movement of the spindle carrier for thereby inwardly shifting the said slide 310, as seen in FIG. 12.

The slide 310 is adapted to slide on the top face of the head closure 30 of the tool head 29. The slide 310 is retained in position by a flange 311 projecting from a bracket 312 secured to the head closure plate 30. This slide 310 has projecting from its forward end a pin 313, in turn, having at its forward end a plate 314 in line with the pin 301. The slide is provided intermediate its ends with rack teeth 315 meshing with a segmental gear 316, rotatably mounted on the bushing 170 carried by the tool head plate 30.

The segmental gear 316 has projecting downwardly thereof an arm 317 provided at its lower end with a circular head 318 having contacting on opposite sides thereof the pivot valve members 207 and 289. The pilot valve members 207 and 289 are associated with valve mechanisms which operate the piston plungers 219 and 297 for shifting the main control valve member 153, see FIG. 13.

This inward movement of the slide 310, through its rack teeth 315, oscillates the arm 317 for shifting the valve member 207 of pilot valve mechanism 202. The pilot valve mechanism 202, as noted above, is shown diagrammatically in FIG. 13 and has contacting with one end of its valve member 207 one end of a coil spring 319, which has its other end seated in the valve block, not shown, that houses the valve member 207. The spring 319 is utilized to return the parts to their normal positions when pressure on the slide 310 is removed.

The shifting of the slide 310 and the oscillation of the arm 317 shifts the valve member 207 of the valve mechanism 202 so that its cannelure or reduced portion 211 connects the ports 205 and 206 thereby connecting the hydraulic pressure medium from the pump 139 through the pipes or conduits 141, 216 and 215 with the pipe or conduit 213 with the piston plunger mechanism 214. The hydraulic medium actuates the piston plunger 219 of the piston plunger mechanism 214 to the right as seen in FIG. 13 thereby actuating the valve shifting lever 171 in a counter-clockwise direction.

The actuating of the lever 171 in said counter-clockwise direction actuates the valve member 153 of the valve mechanism 142 to its right hand position and thereby connects the hydraulic medium from the pump 139 with the tool carrier piston for advancing same at a rapid rate in a tool feeding direction, outwardly to the left, as seen in FIG. 1.

It should be noted that the rapid traverse withdrawal of the tool carrier from the point of torque overload was to a point from which its second rapid advance movement took place that was short of the initial position of the tool carrier and from which initial position the tool carrier was first rapidly advanced through the actuation of either the main control lever 168 or through the actuation of the starting control switch 174.

Immediately after the cumulative rapid traverse dog 224 actuates the main control lever 168 it engages and is held by the bracket 312 through the dog rod 223. The frictional engagement of the said cumulative rapid traverse dog with its rod is such that it actuates the said main control lever but this frictional connection is not such that, while being held, it interferes with the movement of the spindle carrier in its slow feeding direction. From this it follows that the second, and subsequent, rapid traverse advancing movements of the spindle carrier continues to the point where the previous slow feeding movement thereof stopped, except, as will presently be pointed out, when the spindle carrier is returned to its initial position for operation on a new work piece.

The second rapid advance of the tool carrier 85 continues outwardly until the rapid traverse cumulative dog 224 again through its cam nose 225 engages the finger 226 of the manual control lever 168 whereupon the rate of movement of the tool carrier is again reduced to the slow feed as above indicated and which slow movement continues until the torque control mechanism again operates to withdraw the tool carrier or until the work has been completely drilled and in the latter instance the tool carrier is returned to its initial position.

The mechanism for returning the carrier to its initial position and stopping the mechanism comprises a dog 320, see FIGS. 2 and 16, which has a forward face 321 and is adjustably positioned in the T-slot 220 of the tool carrier. This dog 320 is adjusted to the point where it comes into operation after the work has been completely drilled or bored and is adapted to engage a finger 322, see FIGS. 11 and 16, upstanding from the valve actuating rack slide 310.

The actuation of the rack slide 310 is in the opposite direction to that previously set forth or to the left as seen in the drawings. This actuation of the rack slide through its rack teeth 315 operates the segmental gear 316 and arm 317 for actuating the pilot valve mechanism 283, see FIG. 13.

The actuation of the pilot valve mechanism 283, actually the shifting of the valve member 288, through its reduced portion or cannelure 293 connects the ports 286 and 287 for thereby connecting the pressure medium from the pump 139 and pipes 141 and 216 with the pipe or conduit 294 and the piston plunger mechanism 295. The energization of the piston plunger mechanism 295 causes an outward, leftward, movement of the piston plunger 297 therein for actuating the lever 171 in clockwise direction, as seen in FIG. 13, and thereby shifts the main valve member 153 to its left hand position as determined by the stop screw 160.

The shifting of the said main control valve member 153 to its left hand position effects a rapid retraction of the tool carrier as above set forth. This time, however, the said shifting of the main valve member was effected by a mechanical device in no wise connected with the torque on the tool spindle.

The dog 320 has mounted therein a plunger 323 which is normally outwardly projecting from the said dog and with said projection being maintained by a spring 324 behind said plunger. The said plunger is adapted to set up the mechanism to prevent automatic reversal of the spindle carrier since the said work has now been completely drilled or bored.

The operation of this mechanism is as follows:

The bracket 312, supra, is provided with a transverse bore in which is disposed a plunger 325 having a cone or tapered end 326 projecting inwardly of the bracket, see FIG. 11. The plunger 325, in effect, is a rack having its teeth meshed with a pinion 327 on the dog bar 304, carried by the head closure plate 30, supra. The bracket 312 is provided above the plunger 325 with a slot 328 through which projects a pin 329 carried by and movable with the plunger 325. The pin 329 has on its upper end a shoe 330 disposed in a slot 331 at one end of a lever 332 pivotally mounted on the upper surface of the bracket 312. The lever 332 has at its end a point 333 which extends inwardly toward the head 29.

In operation, the dog 320 has the end of its plunger pin 323, while moving to the left, engage the tapered nose 326 of the rack plunger 325 and said plunger pin 323 is actuated inwardly of the dog with said plunger pin 323 snapping to its normal position at about the time the face 321 of said dog 320 engages the rack slide finger 322. Upon reversal, that is, rapid retraction of the spindle carrier, the plunger pin 323 again engages the nose 326 of the rack plunger 325 but now outwardly, to the left as seen in FIG. 11, actuates said rack plunger for rotating the pinion 327 and thereby rotating or oscillating the dog bar 304.

The oscillation of said dog bar 304 carries with it the arm 300 and therefore the pin 302 so that the adjustable abutment 301 on the tool carrier dog bar 223 cannot actuate the valve actuating slide rack 310 to effect an operation thereof as above set forth.

The spindle carrier continues, therefore, in a retracting direction until the said spindle carrier is fully retracted so that the completed work piece may be replaced by an incomplete one.

Mounted on the oscillatable dog rod 304 is a rapid traverse cumulative dog reset dog 334 which is projected into the path of movement of the said cumulative rapid traverse dog 224 for holding same during the final retraction of the tool carrier, in other words, the dog 334 resets the cumulative rapid traverse dog to its initial position so that after replacement of the work piece the spindle carrier may advance to the point where the tool is ready for operation.

In order to reset the automatic cycle of the machine the spindle carrier has further secured in its T-slot 220 a reset dog 335 including a spring biased oscillatable flipper 336. The said reset dog 335 is mounted near the forward end of the spindle carrier wherefore it is ahead of the lever 332 and particularly its pointed finger 333 when final reversal of the tool carrier was effected. The flipper 336 is so mounted that upon said retraction of the spindle carrier the said pointed finger or nose 333 harmlessly actuated the same. After the replacement of the finished work piece with an unfinished one and an advancement of the said spindle carrier from its initial remote position is effected, the said flipper 336 then engages the said finger or nose 333 for actuating the lever 332 in a counter-clockwise direction, as seen in FIG. 16, and thereby positioning the rack plunger 325 to its normal, or inner, position so that the spindle carrier may be automatically controlled after the completion of each work piece.

In torque control work it is frequently unnecessary and even undesirable, due in part to loss of time, to maintain and operate at a constant torque figure. In this connection, for example, it may be desirable to have a higher torque response when initially tooling a piece of work, that is, when starting to drill a hole than after the said hole has been started and the drilling process continued. This is because frequently a tough skin, due to heat treating and the like, may be the cause of a higher resistance to a tool or drill than after the said skin or outer surface has been penetrated. At the same time once the skin has been penetrated a lower torque point could be employed to avoid unnecessary reversal of tool or drill, yet the breakage thereof is avoided since then the tool or drill becomes embraced by the work. At the same time consideration must be given to the fact that as the drill or tool penetrates the work the torque control thereof should be somewhat, though gradually, raised in the interest of efficiency in time.

A modification of the invention with the foregoing thoughts in mind has been incorporated in a drilling machine and illustrated in FIGS. 17, 18 and 19 and will now be defined in sufficient detail to enable others to understand the same.

Accordingly, the machine illustrated in said FIGS. 17, 18 and 19 is substantially the identical machine illustrated in FIGS. 1, 2 and 3 and including a pressure regulating mechanism 337 which is substantially identical with the pressure regulating mechanism 97 above discussed with a few modifications as will hereinafter be noted.

The air pressure regulator 337 includes a body portion 338 from which extends a sleevelike support 339 having in turn extending therethrough and therefrom a plunger 340. The plunger 340, as is well-known to those conversant in this art, will, upon insertion into or projection from the sleeve 339, change the effective pressure from the discharge pipe 341 as compared with the more or less constant infeed pressure in pipe 342.

The pressure regulating mechanism, regulator, or valve, 337, similar to the pressure regulating mechanism 95, above, is mounted in position through a bracket including an upper horizontal arm 343 supporting the pressure regulator body 338 and through an aperture 344 therein projects the sleeve 339. The bracket arm 343 is connected through a vertical portion 345 with a mounting pad 346 and through which the parts are secured to non-moving portion or fixed portion 29 of the tool head.

A further slight distinction in the pressure regulator 337 from the pressure regulator 95 is that the indicating gauge 347 is arranged in a vertical position instead of a horizontal position.

As illustrated, particularly in FIGS. 18 and 19, the vertically adjustable plunger 340 of the pressure regulator is provided at its lower end with a stem 348 having rotatably mounted at its lower end a roller 349 and with said stem 348 slidably passing through a guide 350. The guide 350 is mounted in operative position by a strap or connecting link 351, having its opposite ends integral with or welded or otherwise secured to the said guide sleeve 350 and mounting bracket vertical portion 345.

Mounted on the movable carriage 109 of the drill head disclosed in the drawings and for movement therewith is an elongated cam plate 352. The cam plate is of a length that its upper surface, presently to be described, is in engagement with the plunger roller 349 throughout its entire length so that the pressure from the regulator 337 and through the discharge pipe 341 is at all times under control. As seen particularly in FIG. 18 the cam plate 352 has a substantially horizontal surface portion 353 followed by a sharp decline at 354 to a gradually upwardly inclined portion 355. In practice the cam face portion 353 controls the position of the stem 348 and plunger 340 during the rapid advance of the tool carrier from its idle to initial operative position and this face (353) of the cam plate 352 is of such length that the point of the drill is completely beneath the work piece outer surface. It is understood, of course, that the rate of advance of the drill, tool carrier, was reduced from rapid traverse to feed prior to the encounter of the drill and work and which feed rate was maintained during the initial drilling operation. Obviously the said cam face portion 353 in positioning the stem 348 and plunger 340 to maintain the proper pressure in line 341 and therefore the proper torque against drill reaction and this torque is the highest for the type of tool being used and the type of work being operated upon. The rapid declining cam face portion 354 comes into play substantially immediately after the tip, or forward end, of the drill has penetrated the outer surface of the work and at which time the torque on the drill will be the least and whereupon the stem 348 and plunger 340 drop to the lowest point of the cam face portion 355.

Continued drilling will require a greater reaction torque due, in part, as noted above, to the accumulation of chips in the hole and yet the drill must be able to withstand gradually increasing torque but at all times be beneath its breaking point. Since the said cam face portion 354 gradually increases to a high point 356 which is substantially at the level of the cam face portion 353 the stem 348 and plunger 340 will be gradually pushed inwardly of the pressure regulator sleeve 339 and body 338 thereby increasing the torque reaction point and yet maintaining the safety of the drill.

From the foregoing, it will now be noted that there has been provided a machine which is reversible upon the development of torque on the tool just before the torque point is reached beyond that which it can safely carry and that the machine will completely finish a work piece without reversal in the absence of such torque. The torque control mechanism is extremely sensitive and is accurately adjustable and permanently locked at the torque control point.

It is believed the foregoing accomplishes the objects initially set forth.

What is claimed is:

1. In a mechanism of the class described the combination of a spindle carrying a tool, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, and means operable by said plate upon displacement thereof for discontinuing the driving of the spindle sleeve by the prime mover.

2. In a mechanism of the class described the combination of a spindle carrying a tool, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, means operable by said plate upon displacement thereof for discontinuing the driving of the spindle sleeve by the prime mover, and anti-friction means between said movable member of the piston and cylinder and the stationary member thereof to prohibit drag by the piston and cylinder mechanism.

3. In a mechanism of the class described the combination of a spindle carrying a tool, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, means operable by said plate upon displacement thereof for discontinuing the driving of the spindle sleeve by the prime mover, and means in the fluid pressure line for establishing the effective pressure between the piston and cylinder.

4. In a mechanism of the class described the combination of a spindle carrying a tool, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, means operable by said plate upon displacement thereof for discontinuing the driving of the spindle sleeve by the prime mover, and means automatically varying the pressure in the fluid line for automatically varying the pressure between the piston and cylinder during the drive of the spindle driving sleeve.

5. In a mechanism of the class described the combination of a spindle carrying a tool, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, means operable by said plate upon displacement thereof for discontinuing the driving of the spindle sleeve by the prime mover, and means in the fluid pressure line for establishing the effective pressure between the piston and cylinder, and means automatically varying the pressure in the fluid line for automatically varying the pressure between the piston and cylinder during the drive of the spindle driving sleeve.

6. In a mechanism of the class described the combination of a fixed support, a spindle carrier carrying a tool on said support for axial movement relative thereto, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, displaceable means on said spindle driving sleeve in operative connection with the plate, fluid pressure maintaining operative connection between the plate and displaceable means and establishing a given pressure on said displaceable means and determining the torque deliverable by the spindle and its tool, means establishing the normal pressure on said displaceable means, and means associated with the fixed support and movable spindle carrier for varying the said effective torque load on the spindle and its tool.

7. In a mechanism of the class described the combination of a fixed support, a spindle carrier carrying a tool on said support for axial movement relative thereto, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, displaceable means on said spindle driving sleeve in operative connection with the plate, fluid pressure maintaining operative connection between the plate and displaceable means and establishing a given pressure on said displaceable means and determining the torque deliverable by the spindle and its tool, a fluid pressure regulator establishing the normal pressure on said displaceable means, and a cam and follower associated with the fixed support, movable spindle carrier and fluid pressure regulator for varying the effectiveness of the fluid pressure regulator and the effective torque load on the spindle and its tool.

8. In a mechanism of the class described the combination of a fixed support, a spindle carrier carrying a tool on said support for axial movement relative thereto, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, a variable fluid pressure regulator establishing the pressure in said pressure line in accordance with its position, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, and a cam and follower associated with the fixed support movable spindle carrier and fluid pressure regulator for varying the effectiveness of the fluid pressure regulator and the effective torque load on the spindle and its tool.

9. In a mechanism of the class described the combination of a fixed support, a spindle carrier carrying a tool on said support for axial movement relative thereto, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, a variable fluid pressure regulator establishing the pressure in said pressure line in accordance with its position, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, a cam and follower associated with the fixed support movable spindle carrier and fluid pressure regulator for varying the effectiveness of the fluid pressure regulator and the effective torque load on the spindle and its tool and means operable by said plate upon displacement thereof for discontinuing the driving of the spindle sleeve by the prime mover.

10. In a mechanism of the class described the combination of a fixed support, a spindle carrier carrying a tool on said support for axial movement relative thereto, a spindle driving sleeve on the spindle, a prime mover, means connecting the prime mover and spindle driving sleeve for rotating the spindle, a yieldable coupling in said spindle rotating means yieldable to torque on said spindle and its tool with said coupling including a plate encircling the spindle driving sleeve and movable axially of the spindle, a piston and cylinder encircling said spindle driving sleeve with one of said piston and cylinder secured to said spindle driving sleeve behind said plate, a fluid medium pressure line having therein fluid under given pressure and with said pressure line connected with said piston and cylinder to establish a given pressure between said piston and cylinder, a variable fluid pressure regulator establishing the pressure in said pressure line in accordance with its position, means holding one of said piston and cylinder against axial movement while permitting axial movement of the other, one of said piston and cylinder having contact with the plate thereahead due to the pressure therebetween, means between said spindle driving sleeve and plate for establishing a driving connection under normal torque conditions between the plate and piston and cylinder with said means including means displaceable upon an increase in torque on the spindle and its tool, a cam and follower associated with the fixed support movable spindle carrier and fluid pressure regulator for varying the effectiveness of the fluid pressure regulator and the effective torque load on the spindle and its tool, means operable by said plate upon displacement thereof for discontinuing the driving of the spindle sleeve by the prime mover, and anti-friction means between said movable member of the piston and cylinder and the stationary member thereof to prohibit drag by the piston and cylinder.

No references cited.

FRANCIS S. HUSAR, *Primary Examiner.*